UNITED STATES PATENT OFFICE.

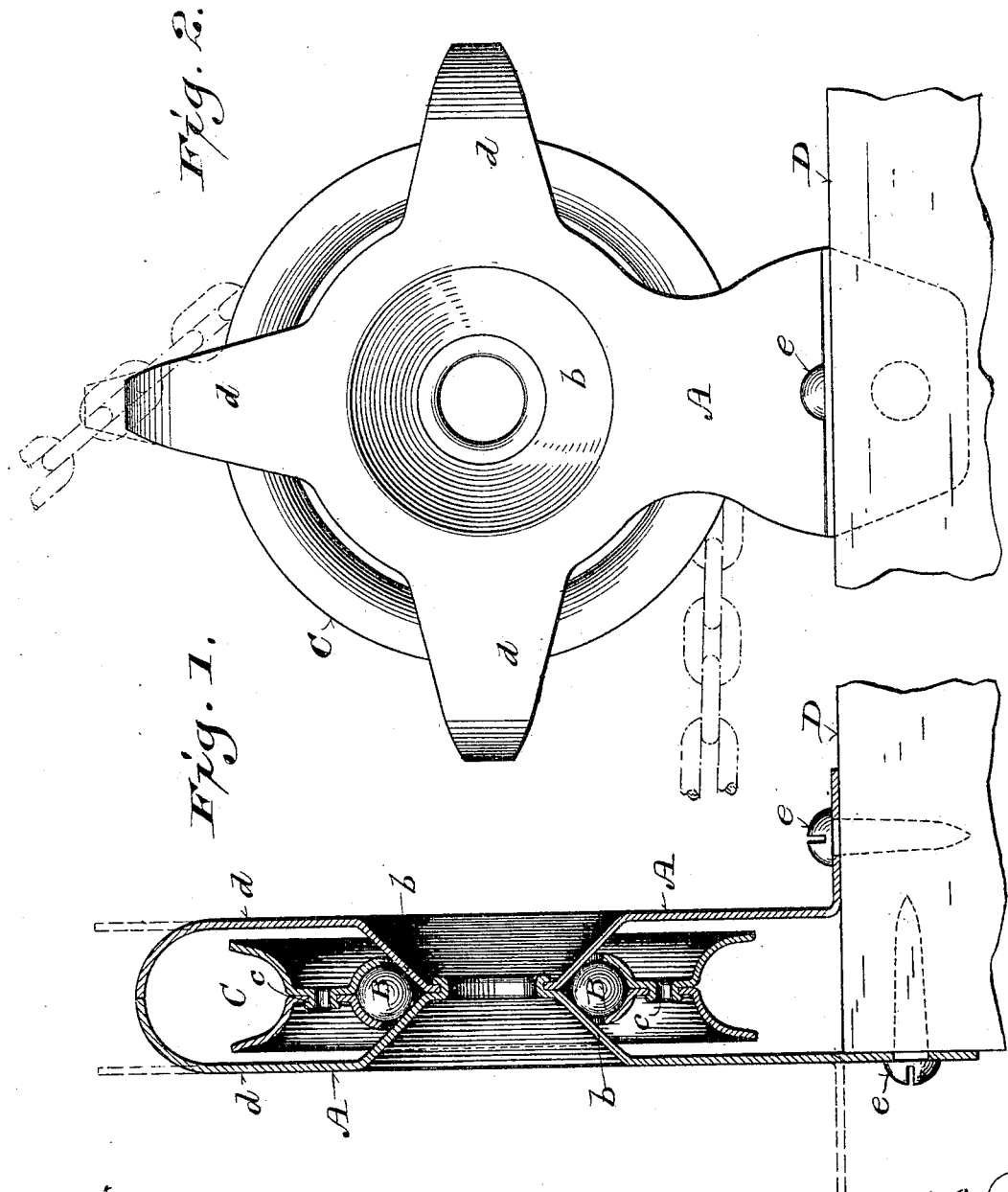

ANTHONY B. FERDINAND, OF WAUWATOSA, WISCONSIN.

GUIDE-PULLEY.

No. 819,874.

Specification of Letters Patent.

Patented May 8, 1906.

Application filed February 2, 1906. Serial No. 299,085.

*To all whom it may concern:*

Be it known that I, ANTHONY B. FERDINAND, a citizen of the United States, and a resident of Wauwatosa, in the county of Milwaukee and State of Wisconsin, have invented certain new and useful Improvements in Guide-Pulleys; and I do hereby declare that the following is a full, clear, and exact description thereof.
My invention consists in certain peculiarities of construction and combination of parts hereinafter particularly set forth with reference to the accompanying drawings, and subsequently claimed, its object being to provide simple, economical, preferably ball-bearing guide-pulleys, the shells of which may be set at various angles with relation to their supports and which are separable at various points circumferentially of the sheaves to accommodate these sheaves to the run of cords, cables, bands, or chains in any direction, said pulleys being especially designed as guides for flexible devices by which draft and check-doors of heating apparatus are controlled as to variable adjustment.

Figure 1 of the drawings represents a central transverse sectional view of a guide-pulley in accordance with my invention, and Fig. 2 a side elevation of the same.
Referring by letter to the drawings, A indicates each of a pair of parallel plates of ductile metal, preferably sheet-steel, from which they are swaged. These plates are shown centrally apertured and swaged or otherwise drawn inward to form opposing cones b, the meeting ends of which are seamed together or otherwise suitably connected. By means of the cones a race for bearing-balls B is formed between the plates A, and these connected plates form a guard-shell inclosing a sheave C, that is channeled for the engagement therewith of the balls aforesaid. The sheave is preferably made from a pair of sheet-steel disks swaged into the desired conformation, and the sections of said sheave thus formed are united by any suitable means. As herein shown, one section of the sheave may be provided with nipples c, engaged with corresponding apertures of the other section and upset upon the latter section to fasten the two together.

The plates A of the guard-shell are provided with a plurality of radial branches d at any suitable number and interval apart, and the branches of one plate are opposite those of the other and ordinarily bent at their outer ends to meet over the periphery of the sheave; but in case of interference with the run of a cord, cable, band, or chain they are spread apart, as shown by dotted lines in Fig. 1. By dotted lines in Fig. 2 a chain is shown at such an angle to the sheave that it passes between separated branches of the shell-plates, but at least one pair of said branches and said plates themselves will serve to guard the flexible device run in contact with said sheave. The shell-plates A may straddle a support to which they are fastened or either one or both of them may be readily bent to have the same angle or angles of the opposing face or faces of said support. It is shown by full lines in Fig. 1 that the attaching ends of said shell-plates are at right angles to each other in opposition to an end and side of a beam D and by full and dotted lines in the same illustration said ends of said plates are shown as being bent to extend in opposite directions on the same plane. Screws e, nails, or tacks are driven through apertures in the attaching ends of the shell-plates to fasten a guide-pulley in accordance with my invention to its support, and from the foregoing it will be understood that said pulley can be readily attached to any suitable support and set at various angles to the same, the balls B serving to prevent bind of the sheave C in any position of the shell aforesaid. It is also to be understood that the face of the sheave is guttered, as herein shown, or otherwise as the demands of the trade may require, and while a suitable construction for ball-bearing of the sheave in the shell has been shown and described the same result may be accomplished in various ways.

While the sides of the pulley-shell are shown as separate plates having opposite radial branches ordinarily bent to meet over the periphery of the pulley-sheave, it is evident that both sides of said shell may be cut in one piece with a connecting-strip suitably bent to form connected radial branches of both sides, a cutting of said strip whenever necessary serving to separate said branches. It is also to be understood that I do not limit myself to a ball-bearing pulley-sheave or the radial branches of the sides of the pulley-shell bent inward over the periphery of said sheave, as said branches may be left straight at the factory and any pair or pairs of the same bent inward, as may be desirable in practice.

I claim—

1. A guide-pulley, the shell sides of which are provided with connected integral inwardly-extending meeting cones and opposite radial flexile branches, the sheave of the pulley being in ball-bearing support on said cones.

2. A guide-pulley, the shell sides of which are bendable at their attaching ends to various angles and provided with connected integral inwardly-extending meeting cones as well as with opposite radial flexile branches, the sheave of the pulley being in ball-bearing support on said cones.

3. A guide-pulley, the shell sides of which comprise parallel sheet-metal plates having opposite radial flexile branches, as well as connected integral inwardly-extending meeting cones, the attaching ends of said shell sides being bendable to various angles, and the pulley-sheave in ball-bearing support on said cones.

In testimony that I claim the foregoing I have hereunto set my hand, at Milwaukee, in the county of Milwaukee and State of Wisconsin, in the presence of two witnesses.

ANTHONY B. FERDINAND.

Witnesses:
N. E. OLIPHANT,
GEORGE FELBER.